(12) United States Patent
Lee (10) Patent No.: US 8,553,095 B2
(45) Date of Patent: Oct. 8, 2013

(54) DIGITAL IMAGE PROCESSING APPARATUS CONFIGURED TO PERFORM A PHOTOGRAPHING PREPARATION OPERATION IN RESPONSE TO A PHOTOGRAPHING MOTION AND METHOD OF CONTROLLING THE SAME

(75) Inventor: Jin-gi Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 697 days.

(21) Appl. No.: 12/614,589

(22) Filed: Nov. 9, 2009

(65) Prior Publication Data

US 2010/0118154 A1 May 13, 2010

(30) Foreign Application Priority Data

Nov. 12, 2008 (KR) .................. 10-2008-0112209

(51) Int. Cl.
*H04N 5/228* (2006.01)
(52) U.S. Cl.
USPC .................. 348/208.16; 348/208.2
(58) Field of Classification Search
USPC .................. 348/208.16, 372, 208.2
See application file for complete search history.

(56) References Cited

U.S. PATENT DOCUMENTS

| 6,778,770 | B1* | 8/2004 | Cazier et al. ............ 396/77 |
| 6,956,609 | B2* | 10/2005 | Nishimura ............ 348/335 |
| 7,177,538 | B2* | 2/2007 | Sato et al. ............ 396/55 |
| 7,342,611 | B2* | 3/2008 | Larner et al. ............ 348/372 |
| 7,689,840 | B2* | 3/2010 | Mizutani ............ 713/300 |
| 7,917,021 | B2* | 3/2011 | Yamamoto ............ 396/52 |
| 2004/0130650 | A1 | 7/2004 | Lee et al. |
| 2008/0231714 | A1* | 9/2008 | Estevez et al. ............ 348/208.16 |

* cited by examiner

*Primary Examiner* — Ngoc-Yen Vu
(74) *Attorney, Agent, or Firm* — Drinker Biddle & Reath LLP (57) ABSTRACT

Provided are a digital image processing apparatus that detects a motion of a body, such as oscillation, shake, or velocity change of the body, to perform a photographing preparation operation, and a method of controlling the digital image processing apparatus. The digital image processing apparatus includes a motion sensor installed in the apparatus and configured to generate a signal in response to motion of the apparatus, and a controller receiving the motion signal, and controlling the digital image processing apparatus to perform a photographing preparation operation when the signal indicates that the motion is a photographing motion made in preparation of a user performing photography.

20 Claims, 5 Drawing Sheets

DIGITAL IMAGE PROCESSING APPARATUS CONFIGURED TO PERFORM A PHOTOGRAPHING PREPARATION OPERATION IN RESPONSE TO A PHOTOGRAPHING MOTION AND METHOD OF CONTROLLING THE SAME

CROSS-REFERENCE TO RELATED PATENT APPLICATION

This application claims the benefit of Korean Patent Application No. 10-2008-0112209, filed on Nov. 12, 2008 in the Korean Intellectual Property Office, the entire contents of which is incorporated herein by reference.

BACKGROUND OF THE INVENTION

1. Field of the Invention

The disclosure of a digital image processing apparatus and method of controlling the same relates to a digital image processing apparatus that can detect a user's preliminary-photographing motion and a method of controlling the digital image processing apparatus.

2. Description of the Related Art

A digital image processing device includes devices necessary for processing images acquired using a digital camera, a personal digital assistant (PDA), a phone camera, or a PC camera, or includes an image recognition sensor.

In the digital image processing device, an image input through an image pickup device can be displayed and seen on an image display device. In addition, a user can capture a desired image by using a shutter release button and store the desired image as an image file while confirming the image displayed on the display device.

A user may spontaneously see an image to capture using their digital image processing apparatus only to miss the image because the user has to wait for the digital image processing apparatus to power on. The missed images may be important to the user and the user may become frustrated with the digital image processing apparatus.

SUMMARY OF THE INVENTION

A digital image processing apparatus is disclosed. The digital image apparatus includes a motion sensor installed in the digital image processing apparatus and configured to generate a motion signal in response to motion of the apparatus; and a controller configured to receive the motion signal and generate a photographing preparation signal when the motion signal is determined to be a photographing motion; and the digital image processing apparatus may be configured to perform a photographing operation in response to the generated photographing preparation signal.

The photographing motion may be a user moving the digital image processing apparatus to the user's face.

The digital image processing may include a power switch configured to enter a power-on state in response to the generated photographing preparation signal.

The motion sensor comprises may include an angular velocity sensor configured to measure an angular velocity of the apparatus; and an acceleration sensor configured to measure a velocity change of the apparatus.

The digital image processing apparatus may include a zoom lens; a driving unit configured to drive the zoom lens; and the digital image processing apparatus may be configured to move the zoom lens to a reference location in response to the generated photographing preparation signal.

The digital image processing apparatus may be configured to move the zoom lens at a second velocity higher than a first velocity in response to the generated photographing preparation signal and a user's manipulation of the zoom lens at the first velocity.

The controller may be configured to generate a signal for the power switch to enter a power-off state when the digital processing apparatus is idle for a reference period of time.

The digital image processing apparatus may be a digital camera, a personal digital assistant (PDA), a phone camera, a PC camera, or a device that includes an image recognition sensor.

The controller may be configured to receive the motion signal from the angular velocity sensor and the acceleration sensor and configured to generate the photographing preparation signal when the signal received from the angular velocity sensor is greater than a first reference level or when the signal from acceleration sensor is greater than a second reference level.

A method of controlling a digital image processing apparatus is disclosed. The method includes in response to motion of the apparatus, generating a motion signal; determining whether or not the motion signal is a photographing motion; generating a photographing preparation signal when the generated motion signal is determined to be a photographing motion; and when the photographing preparation signal is generated, performing a photographing preparation operation.

In response to motion of the apparatus may include in response to motion of the apparatus, generating a motion signal when the power switch is powered-off.

Perform a photographing preparation operation may include performing a photographing preparation operation by powering-on a power switch of the digital image processing apparatus.

Generating may include in response to motion of the apparatus, generating a first motion signal indicating an angular velocity of the apparatus and generating a second motion signal indicating an acceleration of the apparatus.

Determining whether or not the motion signal is a photographing motion may include determining the motion signal is a photographing motion if the level of the first signal is greater than a first reference level or if the level of the second signal is greater than a second reference level.

Determining whether or not the motion signal is a photographing motion may include determining the motion signal is a photographing motion based on the first signal and the second signal.

The method of may include powering-off the power switch when the digital image processing apparatus does not operate for a reference period of time.

Performing a photographing preparation operation may include performing a photographing preparation operation by moving a zoom lens to a reference location.

Performing a photographing preparation operation may include performing a photographing preparation operation by setting a driving velocity at which the zoom lens barrel is driven so as to move the zoom lens to the reference location.

The method may include performing a photographing preparation operation by: when the zoom lens is moved at a first velocity by a user's zooming manipulation, moving the zoom lens at a second velocity higher than the first velocity.

Moving a zoom lens may include operating a barrel of the zoom lens; determining whether the zoom lens barrel is moved to a reference location that is previously set; and stopping the operation of the zoom lens barrel when the zoom lens barrel is moved to the reference location.

BRIEF DESCRIPTION OF THE DRAWINGS

The above and other features and advantages of the disclosure of the digital photographing apparatus and method to control same will become more apparent by describing in detail exemplary embodiments thereof with reference to the attached drawings in which.

DETAILED DESCRIPTION OF THE INVENTION

Thus there is a need in the art for a digital image processing apparatus including a motion sensor installed in the digital image processing apparatus and configured to generate a motion signal in response to motion of the apparatus; and a controller configured to receive the motion signal and generate a photographing preparation signal when the motion signal is determined to be a photographing motion; and wherein the digital image processing apparatus is configured to perform a photographing operation in response to the generated photographing preparation signal.

Hereinafter, the disclosure of the digital photographing apparatus and method to control same will be described in detail by explaining exemplary embodiments with reference to the attached drawings.

Figure 1:
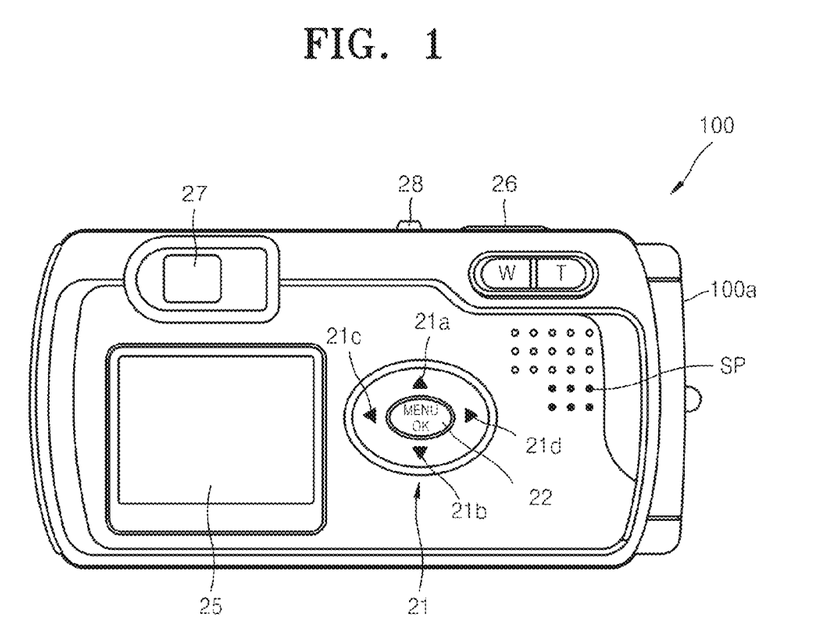
FIG. 1 is a diagram illustrating an example of the external shape of the backside of a digital camera as an example of a digital image processing device.

FIG. 1 is a diagram illustrating the external shape of the backside of a digital camera 100 as an example of a digital image processing device.

Referring to FIG. 1, a direction button 21, a menu-OK button 22, a wide angle-zoom button (W), a telephoto-zoom button (T), and a display panel 25 may be disposed on the backside of the digital camera 100.

The direction button 21 may include a total of four buttons, an up button 21A, a down button 21B, a left button 21C, and a right button 21D. The direction button 21 and the menu-OK button 22 are input keys for executing a variety of operations of the digital camera 100.

The view angle may increase or decrease according to an input of the wide angle-zoom button (W) or the telephoto-zoom button (T). In particular, the buttons can be used in order to change the magnitude of a selected exposed area. In this case, when the signal of the wide angle-zoom button (W) is input, the magnitude of the selected exposed area may increase, and when the signal of the telephoto-zoom button (T) is input, the magnitude of the area may decrease.

An image display device such as a liquid crystal display (LCD) may be used as the display panel 25. A sound that is recorded via a microphone may be output by a speaker (SP).

An object lens and an eyepiece may be disposed on the front and back surfaces of a viewfinder 27, respectively, that is, on the front or back surface of the digital camera 100, respectively.

The shutter release button 26 opens and closes the shutter in order to expose an image pickup device such as a charge coupled device (CCD) or a film to light for a predetermined time. Also, the shutter release button 26 appropriately exposes an object in conjunction with an aperture (not shown) so that an image can be recorded in the image pickup device.

A motion sensor 310 (see FIG. 3) is installed in a body 100a of the digital camera 100 and detects an instant motion of the body 100a. At this time, when the instant motion of the body 100a has a value equal to or larger than a reference value that is previously set in a sleep mode, this is recognized as a user's motion for photographing, and thus a photographing preparation operation may be performed.

An example of a digital image processing apparatus is the digital camera, and a method and apparatus for controlling the digital camera that are disclosed in U.S. Patent Application Publication No. 2004/0130650 (Title: Method of Automatically Focusing using Quadratic Function in Camera), the entire contents of which is herein incorporated by reference, filed by the applicant of the present application.

Figure 2:
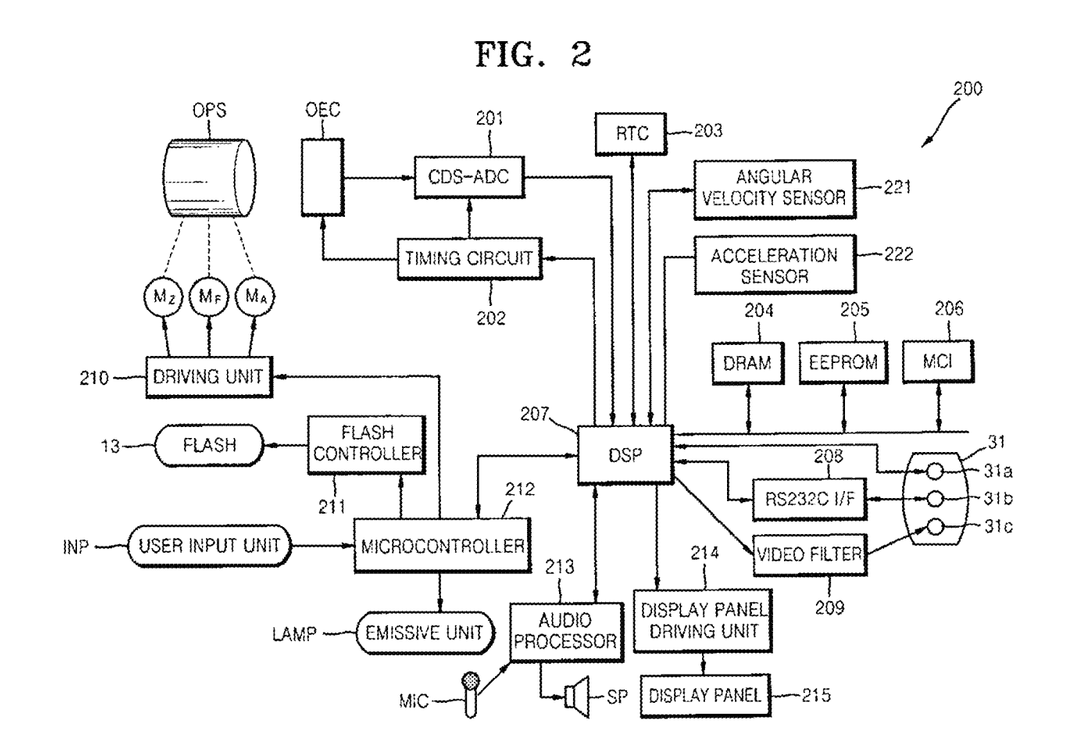
FIG. 2 is a schematic block diagram illustrating an example of a control apparatus of a digital image processing device according.

FIG. 2 is a schematic block diagram illustrating a control apparatus 200 of a digital image processing device according to an embodiment of the present invention. The control apparatus 200 may be mounted inside the digital camera 100 illustrated in FIG. 1.

Referring to FIG. 2, an optical system (OPS) including a lens unit and a filter unit optically processes light bouncing from an object. The lens unit of the optical system (OPS) includes a zoom lens, a focus lens, and a compensation lens. When the user presses the wide angle-zoom button (W) or the telephoto-zoom button (T) included in the user input unit (INP), a corresponding signal is input to a microcontroller 212.

Accordingly, the microcontroller 212 controls a driving unit 210, thereby driving a zoom motor ($M_Z$) and moving the zoom lens. That is, when the wide angle-zoom button (W) is pressed, the focal length of the zoom lens becomes shorter, thereby widening the view angle, and when the telephoto-zoom button (T) is pressed, the focal length of the zoom lens becomes longer, thereby narrowing the view angle.

In an auto focusing mode, a main controller embedded in a digital signal processor 207 controls the driving unit 210 through the microcontroller 212, thereby driving a focus motor ($M_F$). That is, by driving the focus motor ($M_F$), the focus lens is moved to a position where the clearest photo can be obtained.

The compensation lens compensates for the refractive index, and therefore may not be separately driven. Reference symbol $M_A$ indicates a motor for driving an aperture (not shown).

In a filter unit of the optical system (OPS), an optical low pass filter removes optical nose having a high frequency component. An infra-red cut filter cuts off an infrared component of incident light.

A photoelectric conversion unit (OEC) of the control apparatus 200 may include an image pickup device such as a CCD and a complementary metal-oxide-semiconductor (CMOS) device. The photoelectric conversion unit (OEC) converts light from the optical system (OPS) into an analog electric signal.

An analog-digital conversion unit of the control apparatus 200 may include a correlation double sampler and an analog-to-digital converter (CDS-ADC) device 201. The analog-digital conversion unit processes an analog signal from the photoelectric conversion unit (OEC) to remove high frequency noise and adjust the amplitude thereof, and then, converts the signal into a digital signal. In this case, a digital signal processor 207 controls a timing circuit 202, thereby controlling operations of the photoelectric conversion unit (OEC) and the analog-digital conversion unit 201.

A real-time clock 202 provides time information to the digital signal processor 207. The digital signal processor 207 processes a digital signal from the CDS-ADC device 201, thereby generating a digital image signal defined by a luminance (Y value) and chromaticity (R, G, B) values.

A light emitting unit (LAMP) driven by the microcontroller 212 according to control of the main controller embedded in the digital signal processor 207 may be a self-timer lamp, an auto-focusing lamp, a mode indication lamp and a flash wait lamp. The user input unit (INP) may include a direction button 21 (see FIG. 1), a wide angle-zoom button (W), and a telephoto-zoom button (T).

A digital image signal from the digital signal processor 207 is temporarily stored in a dynamic random access memory (DRAM) 204. Methods and setting data such as a booting program and a key input program required for the operation of the digital signal processor 207 are stored in an electrically erasable and programmable read only memory (EEPROM) 205. A memory card of the user may be attached to or detached from a memory card interface (MCI) 206.

A digital image signal from the digital signal processor 207 is input to a display panel driving unit 214, and as a result, an image is displayed on a display panel 25.

A digital image signal from the digital signal processor 207 may be transmitted as a serial communication signal through a universal serial bus (USB) connection unit 31A or an RS232C interface 208 and a connection unit 31B thereof, or may be transmitted as a video signal through a video filter 209 and a video output unit 31C.

The digital signal processor 207 may include a microcontroller embedded therein.

An audio processor 213 outputs a voice signal from a microphone (MIC) to the digital signal processor 207 or a speaker (SP) and an audio signal from the digital signal processor 207 to the speaker (SP).

In addition, the control apparatus 200 may include an angular velocity sensor 221 and an acceleration sensor 222. The angular velocity sensor 221 may detect an angular velocity due to a motion of the body 100a. The acceleration sensor 222 may detect a change in a velocity due to the motion of the body 100a. The angular velocity sensor 221 may be a gyro sensor.

Figure 3:
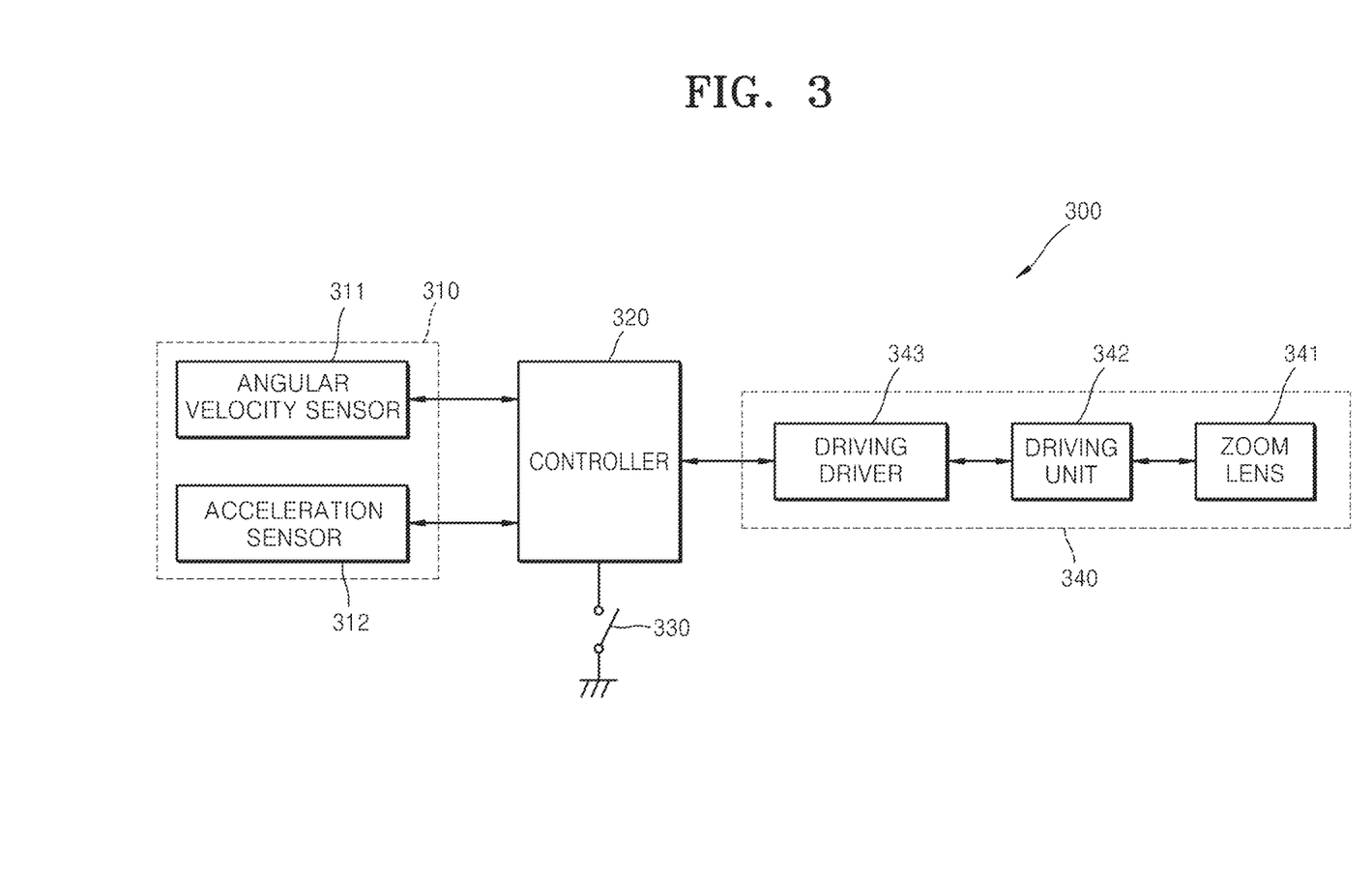
FIG. 3 is a block diagram of an example of a digital image processing device.

The angular velocity sensor 221 and the acceleration sensor 222 may correspond to an angular velocity sensor 311 and an acceleration sensor 312 of an example of a digital image processing device 300 of FIG. 3, respectively.

The digital signal processor 207 and/or the microcontroller 212 may be included in a controller 320 of FIG. 3. The zoom lens of the lens unit corresponds to a zoom lens 341 included in an operation unit 340 of FIG. 3. The driving unit 210 may functions as a driving unit 342 and a driving driver 343 of FIG. 3.

FIG. 3 is a block diagram of an example of a digital image processing device 300.

Referring to FIG. 3, the digital image processing device 300 may include the motion sensor 310 and the controller 320.

The motion sensor 310 may be installed in the body 100a (see FIG. 1), and may detect the motion of the body 100a to generate a motion signal. The controller 320 receives the motion signal, and then controls the digital processing device 300 to perform a photographing preparation operation when a signal level of the motion signal is equal to or higher than a reference level that is previously set.

The digital image processing device 300 may detect the motion of the body 100a via the motion sensor 310, and then may perform the photographing preparation operation when the motion of the body 100a is recognized as a photographing preliminary motion.

For example, when a user suddenly picks up the digital image processing device 300 in order to take a picture, an acceleration or angular velocity of the motion of the body 100a may be momentarily generated.

In this case, even if the digital image processing device 300 is in a power-off state or in a sleep mode, the digital image processing device 300 can be powered-on without pushing a separate power button to enter a mode in which the digital image processing device 300 can perform photographing.

Since a user can save time by not having to push the power button, the photographing preparation operation can be completed within a short period of time. Thus, an unexpected chance for a photograph can be seized.

In order to perform the photographing preparation operation, the digital image processing device 300 includes a power switch 330. When the power switch 330 is maintained in a power-off state, and then the power switch 330 changes to a power-on state in response to a photographing preparation signal input from the controller 320, the photographing preparation operation can be performed.

That is, when the digital image processing device 300 is in a sleep mode corresponding to a power saving mode, and then the digital image processing device 300 recognizes the photographing preliminary motion in response to the motion signal input from the motion sensor 310, the photographing preparation operation can be performed. At this time, in the sleep mode, the power switch 330 may be maintained in a power-off state.

In the sleep mode, all elements of the digital image processing device 300 except for some elements required to promptly use the digital image processing device 300 may be maintained in a power-off state. In this case, when the digital image processing device 300 does not operate for a reference period of time that is previously set or a period of time longer than the reference period, the power switch 330 may be designed to enter a power-off state.

The motion sensor 310 may include the angular velocity sensor 311 and the acceleration sensor 312. The angular velocity sensor 311 may detect an angular velocity due to the motion of the body 100a. The acceleration sensor 312 may detect the velocity change due to the motion of the body 100a.

At this time, the angular velocity may be generated by shake of the body 100a, and the velocity change may be generated by oscillation of the body 100a. In addition, the angular velocity sensor 311 may be a gyro sensor.

That is, the motion sensor 310 is configured by combining the angular velocity sensor 311 and the acceleration sensor 312. Thus, when the angular velocity due to the shake of the body 100a or the velocity change due to the oscillation of the body 100a is equal to or higher than a predetermined reference level that is previously set, the motion of the body 100a can be recognized as the photographing preliminary motion.

The photographing preliminary motion may be referred to as a photographing motion or a user's photographing preliminary motion. The photographing preliminary motion is a motion that indicates that a user of the digital image processing device 300 has moved the digital image processing device 300 in order to use the digital image processing device 300.

In general, the angular velocity corresponds to a rotational component of the motion of the body 100a, and the velocity change corresponds to a linear component of the motion of the body 100a. Thus, since the digital image processing device 300 includes both the angular velocity sensor 311 and the acceleration sensor 312, the digital image processing device 300 can recognize a momentary change due to the motion of the body 100a.

In another embodiment, the digital image processing device 300 may include the motion sensor 310, the controller 320, the power switch 330, and the operation unit 340. The operation unit 340 may perform the photographing preparation operation by the photographing preparation signal input from the controller 320.

The operation unit 340 may include the zoom lens 341, the driving unit 342, and the driving driver 343.

In the digital image processing device 300 including the zoom lens 341, when the digital image processing device 300 recognizes the photographing preliminary motion by the motion signal of the motion sensor 310, in a sleep mode in which the power switch 330 is powered-off, the power switch 330 may be powered-on, and the zoom lens 341 may be moved to a reference location that is previously set.

In this case, since the zoom lens 341 is installed in a zoom lens barrel, the zoom lens 341 is moved by an operation of the zoom lens barrel.

However, in the case of a single focus camera having no zoom lens, or when a zoom lens is positioned at a reference location in a sleep mode corresponding to a power saving mode, the operation unit 340 for moving the zoom lens does not operate in the photographing preparation operation.

The zoom lens 341 may be moved to a reference location that is previously set in response to the photographing preparation signal. The driving unit 342 may move the zoom lens 341 to the reference location. The driving driver 343 may control the driving unit 342. At this time, the reference location may be a wide-angle end WIDE of the zoom lens barrel, like in a general case.

The driving driver 343 may be a motor drive integrated circuit (MDIC). The driving driver 343 may be designed so as to be installed in the controller 320.

A moving velocity of the zoom lens 342 at which the zoom lens 341 moves during the photographing preparation operation may be the same as a moving velocity of the zoom lens 342 at which the zoom lens 341 moves during a general photographing operation. In this case, when the motion signal input from the motion sensor 310 is recognized as the photographing preparation signal, the power switch 330 enters a power-on state, and the zoom lens 341 is moved to the wide-angle end WIDE of the zoom lens barrel. Then, after the photographing preparation operation is completed, the digital image processing device 300 may wait for a photographing initiation signal input by a user.

When a signal level of the motion signal is lower than a reference level, a user's motion is not recognized as a photographing preliminary motion. When the signal level of the motion signal is equal to or higher than the reference level, the user's motion is recognized as a photographing preliminary motion.

Thus, in the sleep mode in which the power switch 330 is powered-off, when the signal level of the motion signal is lower than the reference level, the digital image processing device 300 may be maintained in a sleep mode. In this case, when the signal level of the motion signal is equal to or higher than the reference level, the user's motion is recognized as a photographing preliminary motion. Thus, the power switch 330 enters a power-on state. In addition, in the presence of the zoom lens 341, the zoom lens 341 may be moved to a photographing preparation location.

At this time, when the zoom lens 341 is moved by a user's manipulation of the power switch 330, the zoom lens 341 moves at a first velocity. On the other hand, when the signal level of the motion signal is equal to or higher than the reference level, the zoom lens 341 may be moved at a second velocity that is higher than the first velocity. Thus, the photographing preparation operation due to a user's momentary motion is completed at high speed, and thus a user can capture a desired image without missing a chance for photographing.

At this time, the zoom lens barrel may operate in order to move the zoom lens 341 to the photographing preparation location. When a problem arises with power consumption of the zoom lens barrel or load applied to the driving driver 342 during the operation of the zoom lens barrel, the zoom lens barrel may be driven at the first velocity. When a rapid operation of the zoom lens barrel is required, the zoom lens barrel may be driven at the second velocity.

The zoom lens barrel can be driven at high speed via a method of driving the zoom lens barrel, or by increasing a driving voltage of the driving unit 342.

According to the present embodiment, when the digital image processing device 300 detects the motion of the body 100a through the motion sensor 310, if the motion of the body 100a is recognized as the photographing preliminary motion, the digital image processing device 300 may perform the photographing preparation operation.

Even if the digital image processing device 300 is in a power-off state or in a sleep mode, the digital image processing device 300 can be powered-on without pushing a separate power button to enter a mode in which the digital image processing device 300 can perform photographing. Thus, since the photographing preparation operation can be completed for a short period of time in response to a user's momentary motion, an unexpected chance for photography can be seized to capture a desired image.

Figure 4:
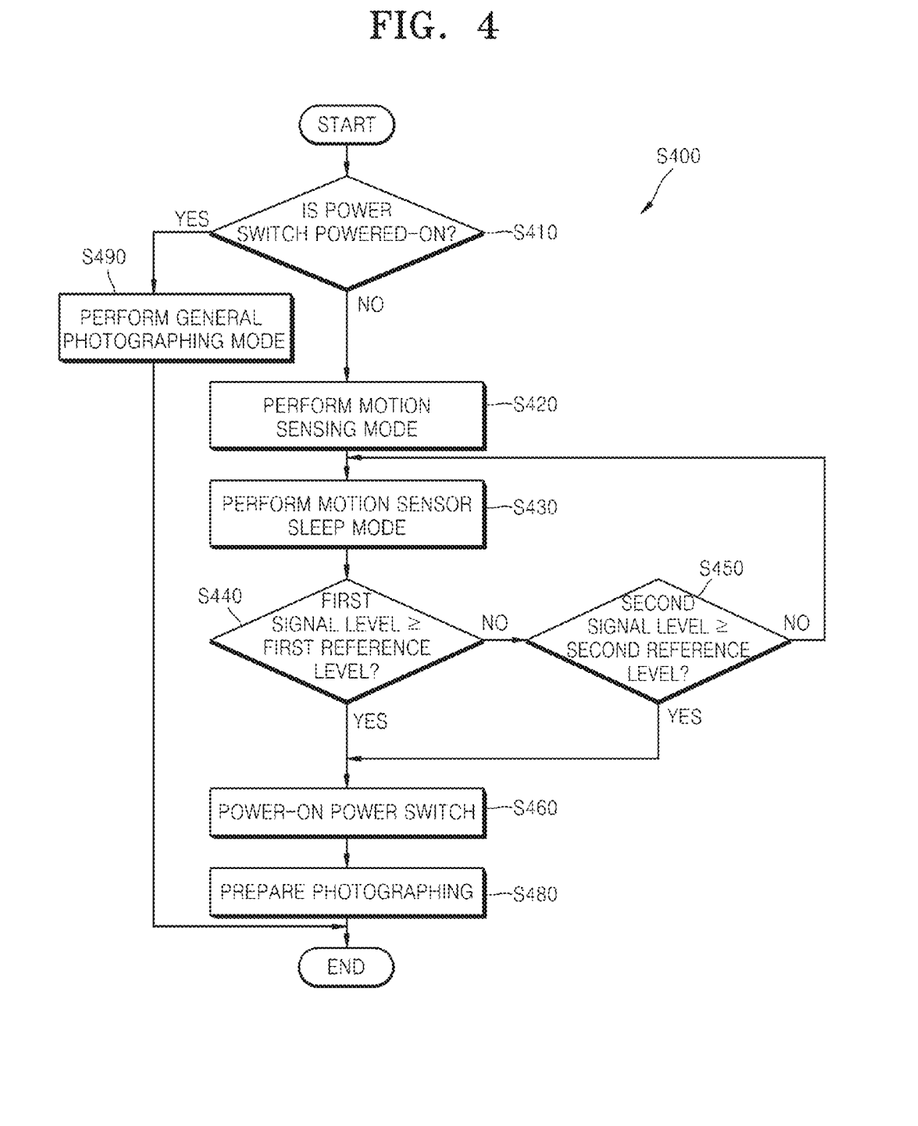
FIG. 4 is a flowchart of an example of a method of controlling a digital image processing apparatus.

FIG. 4 is a flowchart of an example of a method (S400) of controlling a digital image processing apparatus, according to an embodiment of the present invention. The method (S400) according to the present embodiment may be performed by the control apparatus 200 of FIG. 2 and/or the digital image processing device 300 of FIG. 3. Thus, the descriptions of the control apparatus 200 and/or the digital image processing device 300 are referred to in order to explain the method (S400).

The method (S400) may be a program or algorithm that is stored in storage means such as the DRAM 204, the EEPROM 205, and the MCI 206 of FIG. 2 or may be embodied in firmware such as a semiconductor chip.

The method (S400) may be used by a digital image processing apparatus having no zoom lens or in a digital image processing apparatus in which an operation of a zoom lens barrel is not required since initiating a zoom lens location is not required during a photographing preparation operation.

Referring to FIG. 4, the method (S400) may include generating a motion signal (operations S420 and S430); comparing a motion signal (operations S440 and S450); and photographing-preparation & operating (operations S460 and S480).

In the generating of the motion signal (operations S420 and S430), the motion signal is generated by detecting a motion of the body 100a (see FIG. 1). In the comparing of the motion signal (operations S440 and S450), the motion signal is compared with a reference level that is previously set. In the photographing-preparation & operating (operations S460 and S480), when a signal level of the motion signal is equal to or higher than the reference level, the photographing preparation operation is performed.

In the method (S400), the motion signal is generated by detecting the motion of the body 100a (see FIG. 1) by the motion sensor 310 (FIG. 3), and the photographing preparation operation is performed when the motion of the body (or apparatus) 100*a* (see FIG. 1) is recognized as a photographing preliminary motion.

For example, when a user picks up the digital camera 100 (see FIG. 1) in order to urgently take a photograph, a velocity or angular velocity of the motion of the body 100*a* may momentarily change. In this case, even if the digital camera 100 (see FIG. 1) is in a power-off state or in a sleep mode, the digital camera 100 can be powered-on without pushing a separate power switch to enter a mode in which the digital camera 100 can perform photographing.

Since a user can save the time required to push a power button, the photographing preparation operation can be completed within a short period of time. Thus, since an unexpected chance for photographing can be seized, a desired image can be captured.

To achieve this, the method (S400) may further include determining a power switch state (operation S410). In the determining of the power switch state (operation S410), it may be determined whether the power switch is powered-off.

At this time, when the power switch is powered-off, the generating of the motion signal (operations S420 and S430) may be performed to generate the motion signal. When the power switch is powered-on, a general photographing mode may be performed (operation S490). That is, when the power switch is powered-off, it is determined that the digital camera 100 is in a sleep mode corresponding to a power saving mode. In addition, it may be determined in response to the motion signal that a user's photographing preliminary motion is performed in the sleep mode.

In a sleep mode, all elements of the digital image processing device 300 (see FIG. 3) except for some elements required to promptly use the digital image processing device 300 may be maintained in a power-off state. In this case, when the digital image processing device 300 does not operate for a reference period of time that is previously set or a period of time longer than the reference period, the power switch may be designed to enter a power-off state.

To achieve this, the method (S400) may further include an operation (not shown) in which the power switch is powered-off to be in a sleep mode when the digital image processing device 300 does not operate for a reference period of time that is previously set or a period of time longer than the reference period.

The generating of the motion signal (operations S420 and S430) may include performing a motion sensing mode (operation S420) and performing a motion sensor sleep mode (operation S430). In the performing of the motion sensing mode (operation S420), when it is determined that the power switch is powered-off, based on the result of the determining of the power switch state (operation S410), a motion of the body 100*a* (see FIG. 1) may be detected to generate a motion signal at predetermined time intervals.

The motion signal may be at least one of an angular velocity signal for detecting an angular velocity due to the motion of the body 100*a* and an acceleration signal for detecting a velocity change due to the motion of the body 100*a*. In this case, the angular velocity may be generated due to shake of the body 100*a*, and the velocity change may be generated by oscillation of the body 100*a*.

In the performing of the motion sensor sleep mode (operation S430), the motion sensor 310 (see FIG. 3) generates the motion signal for detecting the motion of the body 100*a* by using the minimum power required to operate the motion sensor 310. The generating of the motion signal (operations S420 and S430) may be performed in a sleep mode or in a power-off state.

The angular velocity signal may correspond to a rotational component of the motion of the body 100*a*, and the acceleration signal may correspond to a linear component of the motion of the body 100*a*.

The comparing of the motion signal (operations S440 and S450) may include a first comparing operation (operation S440) and a second comparing operation (operation S450). In the first comparing operation (operation S440), a first signal level of the angular signal is compared with a first reference level that is previously set. In the second comparing operation (S450), a second signal level of the acceleration signal is compared with a second reference level that is previously set.

At this time, when the first signal level is equal to or higher than the first reference signal, or when the second signal level is equal to or higher than the second reference signal, the photographing-preparation and operating (operations S460 and S480) is performed to perform the photographing preparation operation. That is, when any one of the angular velocity and the acceleration signal is equal to or higher than the reference level, it may be determined that a user's photographing preparation signal is input.

In the method (S400), since a momentary user's input can be detected from the motion signal including both the angular velocity signal and the acceleration signal, a momentary change in the motion of the body 100*a* can be seized without missing the change.

The photographing-preparation and operating (operations S460 and S480) performing the photographing preparation operation may include operating a power switch (operation S460) and a photographing preparation operation (operation S480). The operation of operating the power switch (operation S460) and the photographing preparation operation (S480) may be performed when the motion signal is equal to or higher than a reference level.

In the operation of operating the power switch (operation S460), when the power switch is maintained in a power-off state, and then a signal level of the motion signal is equal to or higher than a reference level, it is determined that a user's photographing preparation signal is input, and then the power switch is powered-on. Thus, rapid photographing can be performed by a user's input using a shutter release button.

To achieve this, in a sleep mode, various photographing preparation operations may be performed in the photographing preparation operation (operation S480).

According to the present embodiment, in the method (S400), when the motion of the body 100 is detected based on the motion signal, if the motion of the body 100 is recognized as the photographing preliminary motion, that is, it is determined that a user's photographing preparation signal is input, the photographing operation may be performed.

Even if the digital image processing device 300 is in a power-off or in a sleep mode, the digital image processing device 300 can be powered-on without pushing a separate power button. Thus, since the photographing preparation operation can be completed in a short period of time in response to a user's momentary operation, an unexpected chance for photography can be seized in order to capture a desired image.

Figure 5:
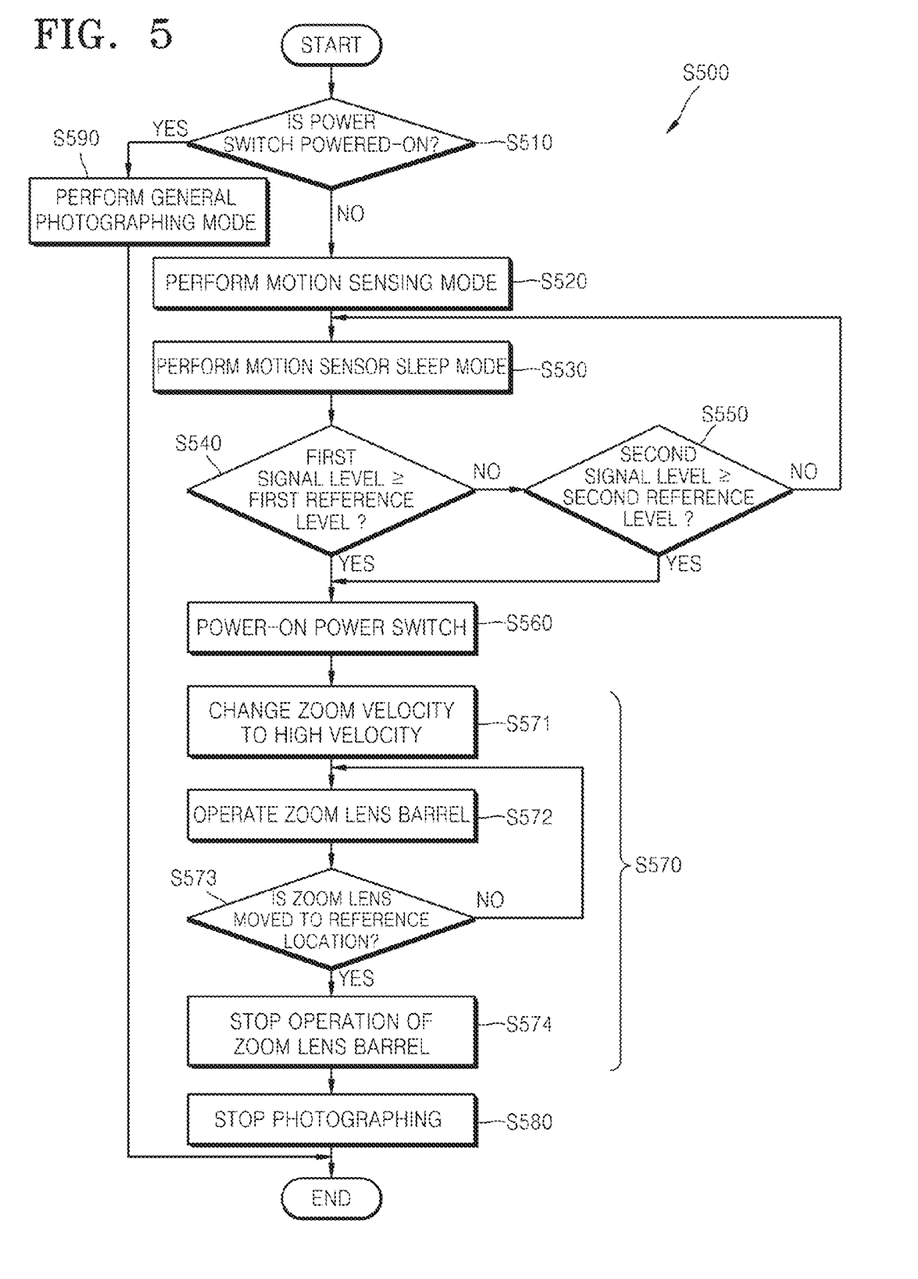
FIG. 5 is a flowchart of an example a method of controlling a digital image processing apparatus.

FIG. 5 is a flowchart of an example of a method (S500) of controlling a digital image processing apparatus, according to another embodiment of the present invention.

The method (S500) according to the present embodiment further includes preparing a zoom lens barrel (operation S570) in addition to the method (S400) of FIG. 4. Thus, the method (S500) may be used in a digital image processing apparatus including a zoom lens.

The method (S500) may include the same operations as those of the method (S400) of FIG. 4, and thus their detailed descriptions are not given here.

Referring to FIG. 5, the method (S500) may include determining a power switch state (operation S510); generating a motion signal (operations S520 and S530); comparing a motion signal (operations S540 and S550); and photographing-preparation and operating (operations S560, S570 and S580).

In the determining of the power switch state (operation S510), it may be determined whether the power switch is powered-off. In the generating of the motion signal (operations S520 and S530), a motion of the body 100a (see FIG. 1) is detected to generate a motion signal. In the comparing of the motion signal (operations S540 and S550), the motion signal is compared with a reference signal that is previously set. In the photographing-preparation and operating (operations S560, S570 and S580), when the motion signal is equal to or higher than a reference level, a photographing preparation operation is performed.

When it is determined that the power switch is powered-off in the determining of the power switch (operation S510), the generating of the motion signal (operations S520 and S530) is performed to generate the motion signal. When it is determined that the power switch is powered-on in the determining of the power switch state (operation S510), a general photographing mode may be performed (operation S590).

That is, when the power switch is powered-off, it is determined that a digital image processing apparatus is in a sleep mode corresponding to a power saving mode. In addition, it may be determined by the motion signal that a user's photographing preliminary motion is performed in a sleep mode. In this case, the generating of the motion signal (operations S520 and S530) may be performed.

In addition, the method (S500) may further include an operation (not shown) in which the power switch is powered-off to be in a sleep mode when a digital image processing device does not operate for a reference period of time that is previously set or a period of time longer that the reference period of time.

The generating of the motion signal (operations S520 and S530) may include performing a motion sensing mode (operation S520) and a performing a motion sensor sleep mode (operation S530).

In the performing of the motion sensing mode (operation S520), when it is determined that the power is powered-off, based on the result of the determining of the power switch state (operation S510), a motion of the body 100a (see FIG. 1) may be detected to generate a motion signal at predetermined time intervals.

In the performing of the motion sensor sleep mode (operation S530), the motion sensor generates the motion signal for detecting the motion of the body 100a by using the minimum power required to operate the motion sensor 310. The generating of the motion signal (operations S520 and S530) may be performed in a sleep mode or in a power-off state.

The comparing of the motion signal (operations S540 and S550) may include a first comparing operation (operation S540) and a second comparing operation (operation S550). In the first comparing operation (S540), a first signal level of an angular signal is compared with a first reference level that is previously set. In the second comparing operation (S550), a second signal level of an acceleration signal is compared with a second reference signal that is previously set.

In the method (S500), since a user's momentary input can be detected from the motion signal including both the angular velocity signal and the acceleration signal, a moment change in the motion of the body 100a can be seized without missing the change.

The photographing-preparation and operating (operations S560, S570 and S580) may include preparing a power switch (operation S560), preparing a zoom lens barrel (operation S570) and photographing-preparation and operating (operation S580).

In the preparing of the power switch (operation S560), when the power switch is maintained in a power-off state, and then the motion signal is equal to or higher than a reference level, it is determined that a user's photographing preparation signal is input, and then the power switch is powered-on. Thus, rapid photographing can be performed by a user's input using a shutter release button.

In a sleep mode, various photographing preparation operations may be performed in the photographing-preparation and operating (operation S580).

In the preparing of the zoom lens barrel (operation S570), a zoom lens is moved to a reference location that is previously set. To achieve this, a zoom lens barrel including the zoom lens may be moved to a lens barrel location that is previously set.

The preparing of the zoom lens barrel (operation S570) may include operating the zoom lens barrel (operation S572), determining a location of a zoom lens barrel (operation S573), and stopping an operation of the zoom lens barrel (operation S574).

In the operating of the zoom lens barrel (operation S572), the zoom lens barrel is moved by operating the zoom lens barrel. In the determining of the location of the zoom lens barrel (operation S573), it is determined whether the zoom lens is moved to a reference location that is previously set. In the stopping of the operation of the zoom lens barrel (operation S574), when the zoom lens is moved to the reference location, an operation of the zoom lens is stopped.

In the operating of the zoom lens barrel (operation S572), the zoom lens barrel operates until the zoom lens barrel is moved to the reference location through the determining of the location of the zoom lens barrel (operation S573) and the stopping of the operation of the zoom lens barrel (operation S574).

Thus, when the operation of the zoom lens barrel is required in a sleep mode, the zoom lens can be moved to a photographing preparation location by moving the zoom lens barrel to the reference location. At this time, the reference location may be a wide-angle end WIDE of the zoom lens barrel, like in a general case.

In addition, the preparing of the zoom lens barrel (operation S570) may further include setting a driving velocity (operation S571). In the setting of the driving velocity (operation S571), the driving velocity of the zoom lens barrel may be set. At this time, the driving velocity of the zoom lens barrel is a velocity at which the zoom lens barrel is driven in order to move the zoom lens to the reference location.

At this time, when the zoom lens barrel is moved by a user's zooming manipulation, the zoom lens barrel may be moved at a first velocity. In addition, when a signal level of the motion signal is equal to or higher than a reference level, the zoom lens barrel may be driven at a second velocity that is higher than the first velocity.

Thus, when the zoom lens barrel is moved by a user's zooming manipulation, the zoom lens barrel is driven at the first velocity that is slower than the second velocity. In addition, when the signal level of the motion signal is equal to or higher than the reference level, the zoom lens barrel may be driven at the second velocity that is higher than the first velocity.

When the zoom lens is moved by a user's manipulation of a power switch, the zoom lens moves at the first velocity. On the other hand, when the signal level of the motion signal is equal to or higher than the reference level, the zoom lens may be moved at the second velocity that are higher than the first velocity.

Thus, the photographing preparation operation due to a user's momentary motion is completed at high speed, and thus a user can capture a desired image without missing a chance for photographing.

At this time, the zoom lens barrel may operate in order to move the zoom lens to the photographing preparation location. When a problem arises with power consumption of the zoom lens barrel or load applied to the driving driver during the operation of the zoom lens barrel, the zoom lens barrel may be driven at the first velocity. When a rapid operation of the zoom lens barrel is required, the zoom lens barrel may be driven at the second velocity.

The various illustrative units, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A digital image processing apparatus including a body comprising:
    a motion sensor installed in the digital image processing apparatus and configured to generate a motion signal in response to motion of the body of the apparatus; and
    a controller configured to receive the motion signal and generate a photographing preparation signal when the motion signal is determined to be movement of the body of the digital image processing apparatus; and
    wherein the digital image processing apparatus is configured to enter into a power-on state and perform a photographing preparation operation which includes operating a zoom lens barrel in response to the generated photographing preparation signal.

2. The digital image processing apparatus of claim 1, wherein the movement of the body of the apparatus is a user moving the digital image processing apparatus to the user's face.

3. The digital image processing apparatus of claim 1, further comprising a power switch configured to enter the power-on state in response to the generated photographing preparation signal.

4. The digital image processing apparatus of claim 3, wherein the controller is configured to generate a signal for the power switch to enter a power-off state when the digital processing apparatus is idle for a reference period of time.

5. The digital image processing apparatus of claim 1, wherein the motion sensor comprises:
    an angular velocity sensor configured to generate a first signal indicative of an angular velocity of the body of the apparatus; and
    an acceleration sensor configured to generate a second signal indicative of a velocity change of the body of the apparatus.

6. The digital image processing apparatus of claim 5, wherein the controller is configured to receive the first signal from the angular velocity sensor and the second signal from the acceleration sensor, and configured to generate the photographing preparation signal when the first signal is greater than a first reference level or when the second signal is greater than a second reference level.

7. The digital image processing apparatus of claim 1, further comprising:
    a zoom lens;
    a driving unit configured to drive the zoom lens; and
    wherein the digital image processing apparatus is configured to move the zoom lens to a reference location in response to the generated photographing preparation signal.

8. The digital image processing apparatus of claim 7, wherein the digital image processing apparatus is configured to move the zoom lens at a second velocity higher than a first velocity in response to the generated photographing preparation signal and a user's manipulation of the zoom lens at the first velocity.

9. The digital image processing apparatus of claim 1, wherein the digital processing apparatus is one of: a digital camera, a personal digital assistant (PDA), a phone camera, a PC camera, or a device that includes an image recognition sensor.

10. A method of controlling a digital image processing apparatus having a body, the method comprising:
    in response to motion of the body of the apparatus, generating a motion signal;
    generating a photographing preparation signal when the generated motion signal is determined to be a movement of the body of the digital image processing apparatus; and when the photographing preparation signal is generated, entering the state of the digital image processing apparatus into a power-on state and performing a photographing preparation operation which includes operating a zoom lens barrel.

11. The method of claim 10, wherein in response to motion of the body of the apparatus, further comprises:
in response to motion of the body of the apparatus, generating the motion signal only when the power switch is powered-off.

12. The method of claim 10, wherein performing a photographing preparation operation comprises:
performing a photographing preparation operation by powering-on a power switch of the digital image processing apparatus.

13. The method of claim 10, wherein generating comprises:
in response to motion of the body of the apparatus, generating a first motion signal indicating an angular velocity of the apparatus and generating a second motion signal indicating an acceleration of the apparatus.

14. The method of claim 13, wherein
determining the motion signal is a photographing motion if the level of the first signal is greater than a first reference level or if the level of the second signal is greater than a second reference level.

15. The method of claim 13, wherein
determining the motion signal is a photographing motion based on the first signal and the second signal.

16. The method of claim 10, further comprising:
powering-off a power switch when the digital image processing apparatus does not operate for a reference period of time.

17. The method of claim 10, wherein performing a photographing preparation operation further comprises:
performing a photographing preparation operation by moving a zoom lens to a reference location.

18. The method of claim 17, wherein performing a photographing preparation operation further comprises:
performing a photographing preparation operation by setting a driving velocity at which the zoom lens barrel is driven so as to move the zoom lens to the reference location.

19. The method of claim 18, further comprising:
performing a photographing preparation operation by:
when the zoom lens is moved at a first velocity by a user's zooming manipulation, moving the zoom lens at a second velocity higher than the first velocity.

20. The method of claim 17, wherein moving a zoom lens further comprises:
operating a barrel of the zoom lens;
determining whether the zoom lens barrel is moved to a reference location that is previously set; and
stopping the operation of the zoom lens barrel when the zoom lens barrel is moved to the reference location.

\* \* \* \* \*